Feb. 28, 1956 F. B. LOAM ET AL 2,736,564
CURB AND STAIR CLIMBER DEVICE
Filed Feb. 12, 1953

INVENTORS
Fay B. Loam and
Harry Loam
BY Henry J. E. Metzler
Attorney

United States Patent Office 2,736,564
Patented Feb. 28, 1956

2,736,564

CURB AND STAIR CLIMBER DEVICE

Fay B. Loam and Harry Loam, New York, N. Y.

Application February 12, 1953, Serial No. 336,582

2 Claims. (Cl. 280—5.26)

The present invention relates to improvements in wheeled vehicles particularly vehicles which are propelled by pushing or pulling such as one-, two-, three-, or four-wheeled shopping carts, baby carriages, hand trucks, wheelbarrows, and the like. The crossing of streets requires a frequent lifting and lowering of manually propelled carts and carriages up and down the sidewalk curbs, which is tiresome, damaging to lightweight carriages and the like, and undesirable for a smooth transportation of the contents thereof.

Therefore, one object of the present invention is the provision of a device of the character described which will reduce to a minimum the effort required for moving carriages and the like up and down sidewalks or stairs by gradually and smoothly lowering and lifting the vehicle as it travels along while crossing streets or while being pulled up a stair, or the like, thereby also greatly reducing the wear and tear on the vehicle as well as the inconvenience to occupants and operators of baby carriages.

Another object of the present invention is the provision of a device of the character described which can be installed not only on newly manufactured carriages, carts, hand trucks, wheelbarrows, or the like, but which also can be substituted for ordinary wheels on such vehicles in a very simple manner.

A further object of the present invention is the provision of a device of the character described which is light in weight and simple in construction consisting of only a few inexpensive parts that can be assembled easily and quickly, but which is also of a pleasing outer appearance, sturdy, durable, and well-adapted for withstanding the rough usage to which devices of this type ordinarily are subjected.

Still another object of the present invention is the provision of a device of the character described which is so constructed that its main parts can be used in connection with wheels of different sizes and that the wheels can be arranged in various positions thereon, thus making the device easily adjustable to the convenience of its operators and to local conditions such as height of stairs, curbs or the like, or the specific types of vehicles in connection with which the device is to be used.

With the foregoing and other objects in view which will appear as the description proceeds, the invention consists of certain novel details of construction and combinations of parts hereinafter more fully described and pointed out in the claims, it being understood that changes may be made in the construction and arrangements of parts without departing from the spirit of the invention as claimed.

In the accompanying drawing a preferred form of the invention has been shown.

In said drawing.

Similar reference characters refer to similar parts throughout the several views.

Figure 1:
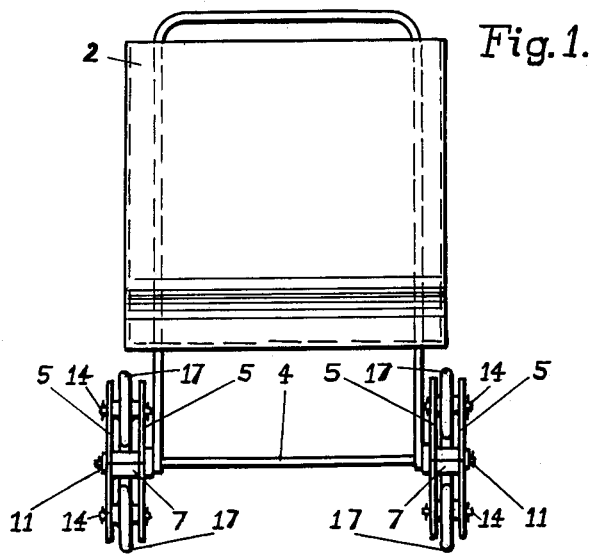
Figure 1 is a front view of a shopping cart provided with a preferred embodiment of our invention.
Figure 2:
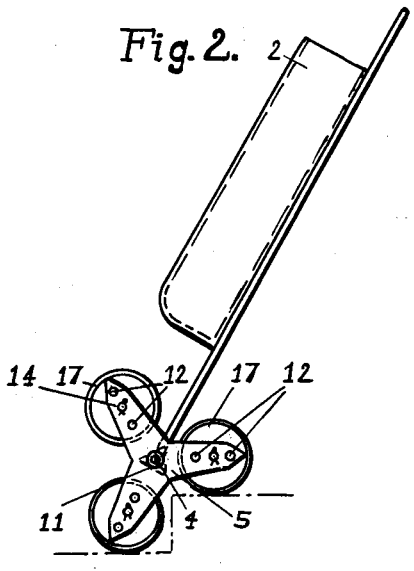
Fig. 2 is a side view thereof.

In Figs. 1 and 2 an embodiment of our invention is shown installed on a two-wheeled shopping cart 2 adapted to be pushed; however, it is obvious that the device can be used also on normally four-wheeled, or three-wheeled, or one-wheeled carriages, hand trucks, carts, wheelbarrows, or the like. The cart 2, which has an axle 4 is no part of our present invention.

Figure 3:
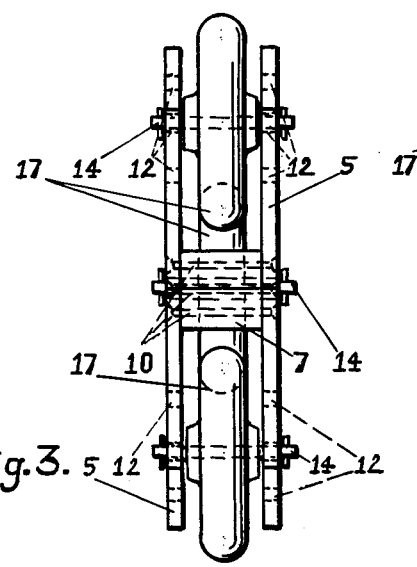
Fig. 3 is an enlarged detailed front view of an embodiment of our invention per se.
Figure 4:
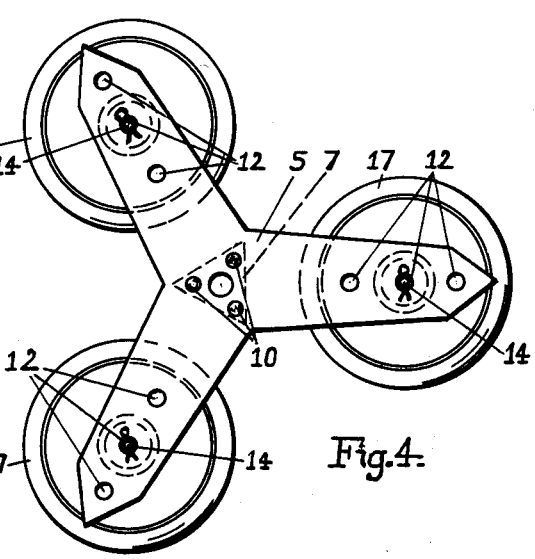
Fig. 4 is a side view of the enlarged embodiment of Fig. 3.

Our new and improved device consists primarily of a pair of preferably star-like members 5 of light metal, such as aluminum, or of plastic material or of any other suitable material, which is rotatably mounted to each end of the axle 4 in place of ordinary wheels. We prefer to interpose a spacing member 7 between the center portions of each pair of members 5 and to secure it thereto by means of rivets 10 or the like, as may be seen in the enlarged Figures 3 and 4. The center portions of the members 5 and the spacing member 7 are provided with registering bores through which extends an end portion of the shaft 4, and a washer as well as a cotter pin 11 or the like are provided on the outer extremities of the shaft beyond the members 5. Each of the branch portions of the members 5 is provided with one or more perforations 12 which are in registering alignment with each other. A pin 14 is extended through a pair of registering perforations 12 in each pair of the branch portions of a pair of disk members 5, and a wheel 17 is rotatable on each pin 14. We prefer to provide a row of perforations 12, three in the instance shown, in each branch portion of each member 5, so that the wheels 17 can be mounted closer to, or further away from, the center of the disk members 5, or that wheels of different diameters can be used in connection with one and the same size of members 5. Thus the device can be adjusted easily.

As may be seen in Figs. 2, 4, 5 and 6, the end sections of the three branch portions of the disk members 5 are triangular. This shape may be obtained by cutting two triangular sections off each one of said branch portions at the outer ends thereof, thus transforming rectangular branch portions of the star-like members 5 to branch portions which have pointed ends. The pieces thus cut off can be used for making spacing members 7 by placing several of said cut-off pieces between the center portions of the members 5. The pointed formation of said branch portions not only is a matter of design but primarily this shape has been chosen for making it possible to adjust the wheels 17 by means of the perforations 12 without having the ends of said branch portions protrude with corner portions beyond the circumference of the wheels. Thus the wheels can be better adjusted to the dimensions of curbs or stairs, particularly open stairs, than if the branch portions of the members 5 were rectangular.

Figure 6:
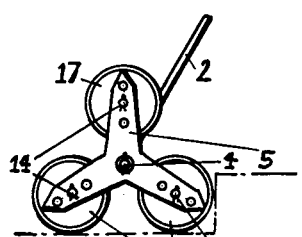
Fig. 6 is a side view as Fig. 5 showing still another operative position.
Figure 5:
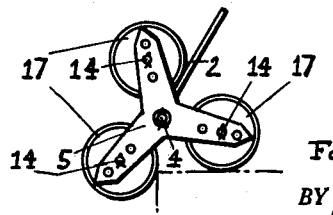
Fig. 5 is a reduced side view showing the device in an operatve position which differs from that shown in Fig. 2.

When traveling on an even surface the device is in the position shown in Fig. 6. When ascending a curb or a step the device is first in the position shown in Fig. 2, and then in the position shown in Fig. 5, the members 5 rotating on the axis 4 and two of the wheels 17 rotating on the pins 14.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described our said invention, what we claim as new and desire to secure by Letters Patent is:

1. In a vehicle having an axle adapted for being provided with wheels, a curb and stair climber device comprising two pairs of substantially flat star-shaped members each of which has a center portion and three branch portions provided with pointed outer extremities and radially extending from the center portion and being gradually decreased in width from the center portion to the outer extremity of each branch portion, and each pair of said members being rotatably mounted on an end of the axle of the vehicle; a triangular spacing member interposed between the center portions of each pair of said star-shaped members and being located therebetween in such a manner that its pointed three ends point toward the junctures of the branch portions of the star-shaped members; and a wheel interposed between each pair of the branch portions of a pair of said star-shaped members and rotatably secured thereto.

2. In a vehicle having an axle adapted for being provided with wheels, a curb and stair climber device comprising two pairs of substantially flat star-shaped members, each of which has a center portion and three branch portions provided with pointed outer extremities and radially extending from the center portions and provided with perforations and each pair of said members being rotatably mounted on an end of the axle of the vehicle; a triangular spacing member interposed between the center portions of each pair of said star-shaped members and being located therebetween in such a manner that its pointed three ends point toward the junctures of the branch portions of the star-shaped members; a pin extended through a pair of aligned perforations of each of the branch portions of a pair of said star-shaped members; and a wheel being rotatable on each pin.

References Cited in the file of this patent

UNITED STATES PATENTS

| | | |
|---|---|---|
| 255,693 | Tauber | Mar. 28, 1882 |
| 650,818 | Buchanan | June 5, 1900 |
| 849,270 | Schafer et al. | Apr. 2, 1907 |
| 1,551,127 | Whyel | Aug. 25, 1925 |
| 1,887,427 | Porcello | Nov. 8, 1932 |
| 2,485,729 | Gentry | Oct. 25, 1949 |